(12) United States Patent
Johnson et al.

(10) Patent No.: US 8,219,993 B2
(45) Date of Patent: Jul. 10, 2012

(54) FREQUENCY SCALING OF PROCESSING UNIT BASED ON AGGREGATE THREAD CPI METRIC

(75) Inventors: Darrin Paul Johnson, San Jose, CA (US); Eric Christopher Saxe, Livermore, CA (US); Bart Smaalders, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1170 days.

(21) Appl. No.: 12/038,705

(22) Filed: Feb. 27, 2008

(65) Prior Publication Data

US 2009/0217277 A1 Aug. 27, 2009

(51) Int. Cl.
*G06F 9/46* (2006.01)
*G06F 1/00* (2006.01)

(52) U.S. Cl. .................................. 718/102; 713/322
(58) Field of Classification Search .................. 718/100, 718/102; 713/322
See application file for complete search history.

(56) References Cited

U.S. PATENT DOCUMENTS

| | | | |
|---|---|---|---|
| 7,861,068 B2 * | 12/2010 | Gorbatov et al. | 712/220 |
| 2006/0168571 A1 * | 7/2006 | Ghiasi et al. | 717/127 |
| 2007/0288728 A1 * | 12/2007 | Tene et al. | 712/227 |

OTHER PUBLICATIONS

Fedorova et al. "Chip Multithreading Systems Need a New Operating System Scheduler", Proceedings of the 11th workshop on ACM SIGOPS European workshop, 2004.*
Intel pentium mobile (P6 core) performance counter events http://oprofile.sourceforge.net/docs/intel-p6-mobile-events.php3, Oct. 19, 2007.

* cited by examiner

*Primary Examiner* — Meng An
*Assistant Examiner* — Brian Chew
(74) *Attorney, Agent, or Firm* — Osha • Liang LLP

(57) ABSTRACT

A device, system, and method are directed towards managing power consumption in a computer system with one or more processing units, each processing unit executing one or more threads. Threads are characterized based on a cycles per instruction (CPI) characteristic of the thread. A clock frequency of each processing unit may be configured based on the CPI of each thread assigned to the processing unit. In a system wherein higher clock frequencies consume greater amounts of power, the CPI may be used to determine a desirable clock frequency. The CPI of each thread may also be used to assign threads to each processing unit, so that threads having similar characteristics are grouped together. Techniques for assigning threads and configuring processor frequency may be combined to affect performance and power consumption. Various specifications or factors may also be considered when scheduling threads or determining processor frequencies.

20 Claims, 8 Drawing Sheets

FREQUENCY SCALING OF PROCESSING UNIT BASED ON AGGREGATE THREAD CPI METRIC

FIELD OF THE INVENTION

The present invention relates generally to computer systems and, more particularly, but not exclusively to managing power usage in computer systems.

BACKGROUND OF THE INVENTION

Advances in computer technology have led to increasing numbers of components being placed on a computer chip. Processor architecture has advanced from having one processor per chip to having multiple processors on a computer chip. Each processor may be multi-stranded. In a multi-stranded processor, two or more hardware threads of execution (strands) may concurrently exist on the processor. In some multi-stranded architectures, two or more hardware threads executing on a processor may each have their own registers, while functional units, such as an execution unit, are shared. In a processor configured for chip multiprocessing (CMP), two or more processor cores exist on the same processor chip. While each core may have a first level cache, the cores may share a second level cache. Strands from a first core execute independently of strands from a second core, though they may interact through shared memory, including the second level cache. A processor may combine chip multiprocessing and hardware multi-stranding, having two or more multi-stranded cores on a single processor.

In course-grained multi-stranding, a strand may use a functional unit until it stalls, such as upon a memory access. At that point, another strand is selected to execute. A context switch from the first strand to the second strand may involve saving the useful states of the first strand and restoring new states to the second strand. When the first strand restarts after stalling, the saved states are returned and the first strand proceeds. In fine-grained multi-stranding, a strand may be selected to execute at a cycle boundary. In horizontal multi-stranding, a group of strands share a pipeline, and different strands may be scheduled on different functional units of the pipeline at the same time. Multiple strands may execute simultaneously, as long as there is no conflict for a shared resource.

Computer system processors consume a significant amount of power. High power consumption can generate large amounts of heat. Mechanisms for dissipating heat can require additional power consumption. The consumption of power, as well as the generation and dissipation of heat can adversely affect computer systems in a number of ways, such as reduction of battery life, wear on components, operational costs, and the like. Increases in complexity and number of components in processors tend to exacerbate problems of power consumption and management of power usage. In multi-stranded computer systems, problems related to power consumption may be further exacerbated, due to the maximized use of processors and components.

Operating systems typically perform a scheduling process, in which software threads are assigned to execute on processor strands. The way a system schedules threads may affect the performance of individual applications, the entire system, or portions thereof.

Generally, it is desirable to employ improved techniques for managing power usage in a computer system, and in particular a multithreaded computer system. Improved techniques for scheduling threads in a multi-stranded computer system are also desirable. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1:
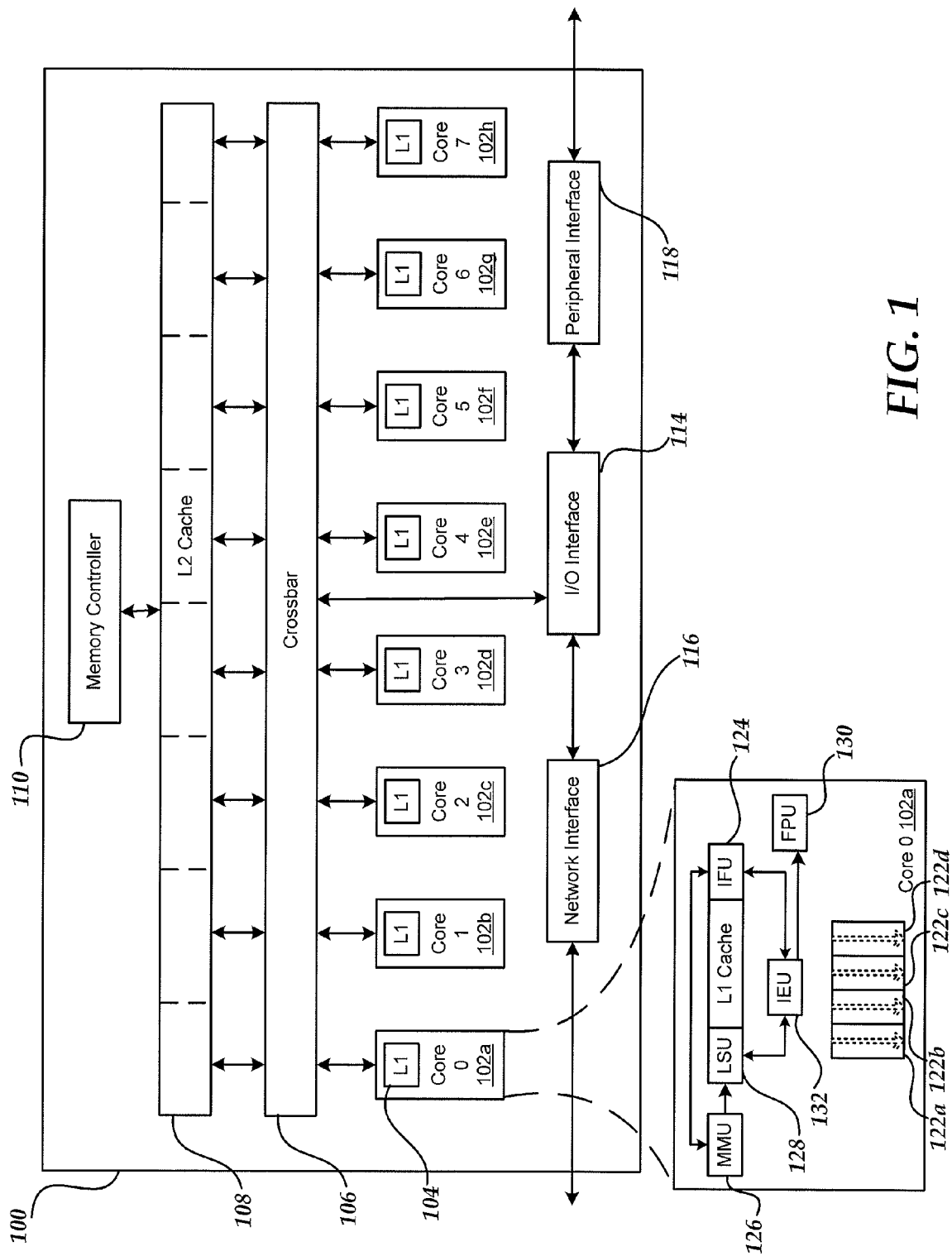
FIG. 1 is a block diagram illustrating one embodiment of a multiple core, multithreaded processing system.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "processing unit" may refer to a processor core, a CPU, a strand, an instruction execution pipeline, or other such processing component within a processor.

As used herein, the term "proper subset" refers to a non-empty subset that contains less elements than the entire set. If A is a proper subset of B, B contains at least one member that is not in A.

As used herein, the term "hardware resource" (HR) refers to a hardware component or class of hardware components that is limited in its availability. Generally a hardware resource may be allocated by a controlling mechanism, such as an operating system kernel. A floating point unit is an example of a hardware resource. As used herein, the term "instance" of a hardware resource refers to a specific component of the class of hardware resource referred to. Different instances of a hardware resource may be, but are not necessarily, identical.

As used herein, the term "thread" refers to a software thread of execution, unless it is described as a "hardware thread" or the context clearly indicates a reference to a hardware thread. The terms "hardware thread" and "strand" are equivalent. The terms "multi-stranded" and "hardware multithreaded" are equivalent.

Chip Multi-Processing (CMP) refers to a processor architecture in which there are multiple processor cores per processor chip. Symmetric multi-threading (SMT) refers to a processor architecture in which a processor core has multiple hardware threads of execution. Chip Multi-Threading (CMT) refers to a processor architecture having multiple processor cores per processor chip and multiple hardware threads of execution per core. Thus, CMT may be considered to be a combination of CMP and SMT.

As used herein, the term "instructions-per-cycle" (IPC) is the multiplicative inverse of cycles-per-instruction (CPI), and the term "based on CPI" includes being based on IPC or another derivative of CPI.

Briefly stated, the present invention is directed toward a computer-based mechanism for managing power in a computer system having multiple processing units. Mechanisms of the invention may include determining, for each thread, a cycles-per-instruction (CPI) characteristic of the thread, and selectively assigning each of the threads to a processing unit based on the thread's CPI characteristic. Mechanisms of the invention may include configuring a clock frequency of a processing unit based on the CPI characteristic of each thread assigned to the processing unit. An amount of power provided to the processing unit may be based on the CPI characteristics of its corresponding threads.

Mechanisms of the invention may further include using a hardware component, such as a performance counter, to count instructions executed by a thread during a sample period, and using the count to determine a CPI for the thread. A hardware component may facilitate determining an aggregate IPC for a group of threads, offloading this operation from the operating system.

Mechanisms of the invention may further include reducing power to, or lowering a frequency of, one or more processing units that have corresponding threads with high CPI metrics, or increasing power to, or the frequency of, processing units that have corresponding threads with low CPI metrics. An aggregate CPI metric, which may be derived by considering or combining individual thread CPI metrics in a variety of ways, may be used as a basis for the determination.

Mechanisms of the invention may further include one or more of a number of specifications or factors that may be considered when determining a frequency or power configuration of processing units. These may include one or more of a user specification of power management preferences, a system default specification, a capacity of each processing unit, thread priorities, component temperatures, power usage, or other factors.

Illustrative Operating Environment

FIG. 1 shows one embodiment of a system 100 having multiple processor cores, each core configured to be hardware multithreaded, in accordance with one embodiment of the invention. System 100 has a CMT architecture. The embodiment of system 100 illustrated in FIG. 1 may be used to implement all, or a portion of, methods of the present invention and associated methods. System 100 may include many more components than those shown. It may also have less than all of those shown. The components shown, however, are sufficient to disclose an illustrative embodiment for practicing the invention. One or more processor chips, and software instructions described herein, may be used to implement various embodiments of methods of the present invention. In one embodiment, all of the illustrated components are on a single chip, and the system may be referred to as a processor chip.

As illustrated, system 100 includes multiple processor cores 102a-h, which are also designated "Core 0" through "Core 7," respectively. Each of cores 102a-h connects to a corresponding first level (L1) cache 104, which holds recently or frequently used data or instructions for expedited retrieval by the core. Each of cores 102a-h is coupled to a level 2 (L2) cache 108 by a crossbar 106. L2 cache 108 is coupled to one or more memory controllers 110, which are coupled in turn to one or more banks of system memory (not shown). Additionally, in the illustrated embodiment, crossbar 106 couples cores 102a-h to input/output (I/O) interface 114, which is in turn coupled to a network interface 116 and a peripheral interface 118. I/O interface 114, peripheral interface 118, and network interface 116 may couple processor 100 to boot and/or service devices, peripheral devices, and a network, respectively.

Cores 102a-h may be configured to execute instructions and to process data according to a particular instruction set architecture (ISA). In one embodiment, the cores 102a-h may be configured to implement the SPARC V9 ISA, although in other embodiments any desired ISA may be employed, such as x86, PowerPC, or MIPS. In one embodiment, the UltraSPARC processor core design may be employed. The processor core may be found in many forms, including the 64-bit SPARC RISC microprocessor from Sun Microsystems, or other 32-bit or 64 bit microprocessors by other manufacturers. Virtually any suitable microprocessors, microcontrollers, or microcomputers may be utilized. In the illustrated embodiment, each of cores 102a-h may be configured to operate independently of the others, such that each of the cores 102a-h, or a portion thereof, may execute in parallel.

Each of cores 102a-h may be configured to execute multiple strands concurrently, where a given strand may include a set of instructions that can execute independently of instructions from another strand. For example, a software process or application may include one or more threads such that each thread is scheduled to execute on one of the cores 102a-h. Multiple threads of a software process or application may execute on the same core, different cores, or a combination thereof. Each of cores 102a-h is referred to as a multi-stranded core. As illustrated by the exploded view of core 102a, core 102a includes four strands, logically represented as strands 122a-d. A strand may be considered to be a virtual central processing unit, and is referred to herein as a CPU. Typically, an operating system manages software threads, and assigns each software thread to execute on a corresponding CPU. The process of assigning software threads to a CPU is referred to as "scheduling" software threads. Though much of the description herein refers to assigning threads to CPUs, threads may also be assigned to processing units other than CPUs, such as cores or execution pipelines. Mechanisms of the invention herein described may be applied to such other processing units.

FIG. 1 further illustrates core 102a coupled with a floating point unit (FPU) 130. In one embodiment, each core is coupled to a corresponding FPU. For example, system 100 may have eight FPUs, one coupled to each corresponding core.

FPU 130 may be configured to execute and provide results for certain floating-point instructions. In one embodiment, FPU may be configured to execute certain graphics oriented instructions. In one embodiment, FPU 130 may implement single and double-precision floating-point arithmetic instructions compliant with the IEEE 754 floating-point standard, such as add, subtract, multiply, divide, and certain transcendental functions. In one embodiment, FPU 130 may implement partitioned-arithmetic and graphics-oriented instructions defined by a version of the SPARC Visual Instruction Set architecture. In one embodiment, FPU 130 may be configured to store floating-point register state information for each strand in a floating-point register. In various embodiments, FPU 130 may be fully pipelined (i.e. FPU 130 may be capable of starting one new instruction per execution cycle), partially pipelined, or may block issue until complete, depending on the instruction type. For example, in one embodiment floating-point add operations may be fully pipelined, while floating-point divide operations may block other divide or square root operations until completed.

The components of system 100 may be configured in a number of ways, including the number of processor chips used, and the placement of components on processor chips. For example, in one configuration, all of the cores 102a-h and associated caches may be on a single processor chip, though in other configurations, they may be distributed across two or more processor chips. One or more of crossbar 106, network interface 116, I/O interface 114, and peripheral interface may optionally be on a processor chip or may be external to it. The system may be configured in a Uniform Memory Access (UMA) architecture or a Non-Uniform Memory Access (NUMA) architecture. Briefly, in a system with a NUMA architecture, CPUs may be configured to access all or a portion of memory, but may have different access costs for at least some of the memory, where an access cost is one or more of an amount of latency, throughput, or another metric. In a system with a UMA architecture, memory access costs of a CPU are uniform across all memory that the CPU can access, though a CPU may be able to access only a portion of memory.

Each of the cores 102a-h may also have a replication of registers (not shown) for each strand, in order to minimize the overhead of switching between strands. The example core 102a further includes an instruction fetch unit (IFU) 124 that is coupled to a memory management unit (MMU) 126, a load store unit (LSU) 128, an L1 cache 104, and at least one integer execution unit (IEU) 132. Though not illustrated in FIG. 1, in various configurations, core 102a may include, one, two, or more IEUs. Each IEU 132 is also coupled to the LSU 128, which is coupled to send data back to each integer execution unit (IEU) 132. Additionally, the LSU 128, IFU 124, and MMU 126 are coupled, through an interface, to the crossbar 106. The four strands 122a-d of core 102a may share an instruction execution pipeline.

In an instruction execution pipeline, instructions are executed in stages, and the execution of multiple instructions overlap. The term instruction execution pipeline may refer to this type of architecture, or it may refer to the components that form a pipelined architecture. For example, the IFU, LSU, and IEU may be referred to as an instruction pipeline.

The crossbar 106 may include logic that allows any core 102a-h to access any bank of L2 cache 108, and that conversely allows data to be returned from any L2 bank to any core. Crossbar 106 may be configured to concurrently process data requests from cores 1002a-h to L2 cache 108 as well as data responses from L2 cache 108 to cores 102a-h. Crossbar 106 may also include logic to queue data requests or responses, such that requests and responses need not block other activity while waiting for service. Additionally, crossbar 106 may be configured to arbitrate conflicts that may occur when multiple cores attempt to access a single bank of L2 cache 108 or vice versa. Thus, the multiple processor cores 102a-h share a second level (L2) cache 108 through the crossbar 106.

L2 cache 108 may be configured to cache instructions and data for use by cores 102a-h. In the illustrated embodiment, L2 cache 108 may be organized into eight separately addressable banks that may each be independently accessed, such that in the absence of conflicts, each bank may concurrently return data to a respective core.

In some embodiments, each processor core 102a-h shares L2 cache 108 to speed memory access and to reduce delays imposed by accessing remote memory subsystems. Cache memory may include one or more levels of dedicated high-speed memory holding recently accessed data, designed to speed up subsequent access to the same data. When data is read from main memory (e.g. through memory controller 110, a copy is also saved in the L2 cache 108, and an L2 tag array stores an index to the associated main memory. The L2 cache 108 then monitors subsequent requests for data to determine if the information needed has already been stored in the L2 cache. If the requested data is present in the L2 cache, the data is retrieved from the L2 cache and delivered to the processor core 102a-h; thus, fetching the information from main memory is not needed. If the data is not present in the L2 cache, the data is fetched from main memory and a copy of the data and its address is stored in the L2 cache 108 for future access.

In some embodiments, L2 cache 108 may implement queues for requests arriving from, and results to be sent to, crossbar 106. In some embodiments, L2 cache 108 may implement a fill buffer configured to store fill data arriving from memory controller 110, a writeback buffer configured to store dirty evicted data to be written to memory, or a miss buffer configured to store L2 cache accesses that cannot be processed as simple cache hits. L2 cache 108 may be implemented as single-ported or multiported (i.e. capable of processing multiple concurrent read or write accesses). Additionally, L2 cache 108 may implement arbitration logic to prioritize cache access among various cache read or write requesters.

While the present invention may be implemented on a vertical multi-stranded processor where a memory space, such as L2 cache, is shared by the strands, the invention may also be implemented with a horizontal multi-stranded processor where the memory space is not shared by the strands, or with a combination of vertical and horizontal multi-stranding.

Memory controller 110 may be configured to manage the transfer of data between L2 cache 108 and system memory, for example in response to L2 fill requests and data evictions. In some embodiments, multiple instances of memory controller 110 may be implemented, with each instance configured to control a respective bank of system memory. Memory controller 110 may be configured to interface to any suitable type of system memory, such as Fully Buffered Dual Inline Memory Module, Double Data Rate or Double Data Rate 2 Synchronous Dynamic RAM, or Rambus DRAM, as well as other types of memory, or combinations thereof.

In the illustrated embodiment, processor system 100 may be configured to receive data from sources other than system memory. I/O interface 114 may be configured to provide a central interface for such sources to exchange data with cores 102a-h or L2 cache 108 via crossbar 106. In some embodiments, I/O interface 114 may be configured to coordinate DMA transfers of data between network interface 116 or peripheral interface 118 and system memory via memory controller 110. In one embodiment, I/O interface 114 may be configured to couple processor 100 to external boot or service devices.

Peripheral interface 118 may be configured to coordinate data transfer between processor system 100 and one or more peripheral devices. Peripheral devices may include storage devices, display devices, multimedia devices, or any other suitable type of peripheral device. Any suitable interface standard or combination of standards may be employed. Examples of standards include Peripheral Component Interface Express, USB, and IEEE 1394.

Network interface 116 may be configured to coordinate data transfer between processor system 100 and one or more devices coupled to processor system 100 via a network. In one embodiment, network interface 116 may be configured to perform the data processing necessary to implement an Ethernet (IEEE 802.3) networking standard such as Gigabit Ethernet or 10-Gigabit Ethernet, though any suitable networking standard may be implemented. In some embodiments, network interface 116 may be configured to implement multiple discrete network interface ports.

In the illustrated configuration, system 100 has eight cores, each core having four strands, for a total of 32 strands. It should be noted that the invention is not limited to a processor chip with eight cores or cores with four strands. Various configurations may have more or less than eight cores, each core may have more or less than four strands, and each core may have one or more IEUs, in accordance with the invention. The invention may also be employed in a configuration having heterogeneous components, or components with different configurations. For example, one or more of cores 102a-h may operate at a different clock speed from the remaining cores. Some cores may have different configurations of components, such as FPU 130, or components with different capabilities, connections, or other differing characteristics. Processors having different configurations or characteristics may be combined in a computing system. In some configurations, the OS or other software may dynamically create heterogeneity, by configuring a higher priority to a core, blocking out a portion of cache or memory, or other such configuration settings.

As discussed above, and illustrated by the exploded view of core 102a, any one or more of cores 102a-h may be configured for multi-stranded execution. In one embodiment, each of cores 102a-h may be configured to perform fine-grained multi-stranding, in which each core may select instructions to execute from among a pool of instructions corresponding to multiple strands, such that instructions from different strands may be scheduled adjacently. For example, in a pipelined embodiment of core 102a employing fine-grained multi-stranding, instructions from different strands of the illustrated strands 122a-d may occupy adjacent pipeline stages, such that instructions from multiple strands may be in various stages of execution during a given core processing cycle.

Figure 2:
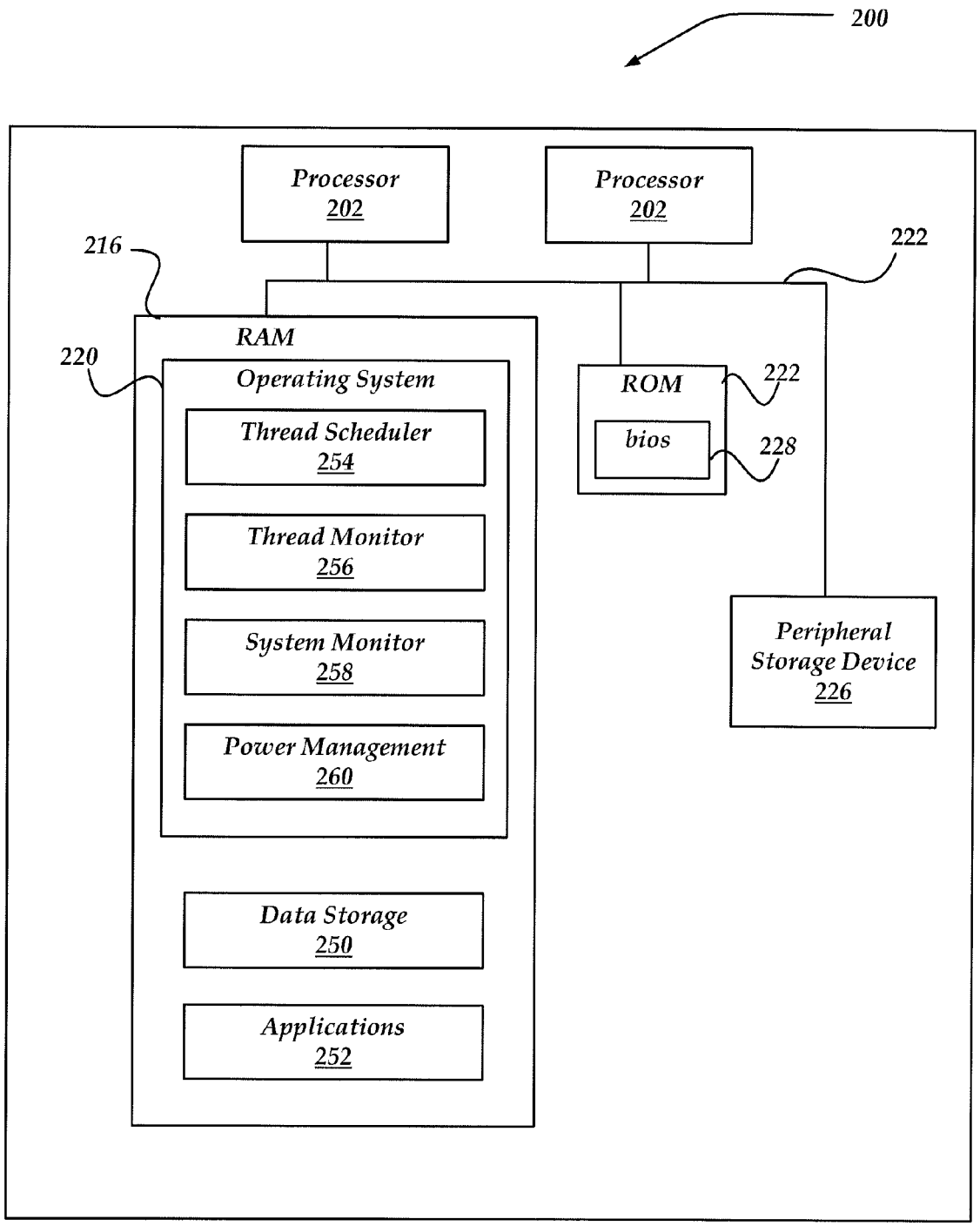
FIG. 2 is a block diagram generally showing one embodiment of a system including two multiple core, multistranded processors.

One embodiment of a system including system 100 is illustrated in FIG. 2. System 200 may include more or less components than those shown. The components shown, however, are sufficient to disclose an illustrative embodiment for practicing the invention. In the illustrated embodiment, system 200 may be a computing device that includes two instances of processor chip 202. Various embodiments of system 200 may include one or more processor chips 202. Each of processor chips 202, or a combination of processor chips 202 may employ the architecture or components of system 100, or a variation thereof. Embodiments of system 200 include mainframe computers, servers, personal computers, handheld computers, PDAs, cell phones, and other devices that include one or more processors.

System 200 includes processor chips 202, system memory, and one or more peripheral storage devices 226 all in communication with each other via bus 222. The system memory, in various embodiments, may include RAM 216, ROM 222, and one or more permanent mass storage devices, such as a hard disk drive, tape drive, optical drive, disk arrays, or floppy disk drive. System 200 may communicate with the Internet, or another communications network, using various communication protocols including IP, TCP/IP, UDP, HTTP, WAP, or other protocols.

The system memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The system memory stores operating system 220 for controlling the operation of system 200 and processor chips 202. Any operating system, including a general-purpose operating system or a special-purpose operating system, may be employed. Basic input/output system ("BIOS") 228 is also provided for controlling the low-level operation of system 200. Though FIG. 2 shows operating system 220 stored in RAM 216, in some configurations, all or a portion of operating system 220 may be stored in ROM 222 or another type of storage.

Operating system 220 may include a thread scheduler 254, a thread monitor 256, a system monitor 258, and a power management component (also referred to as a power manager) 260. Thread monitor 256 may include instructions and logic that monitors the status of each thread executing on processor chips 202 and retrieves data corresponding to the threads, such as CPI or other thread characteristics. System monitor 258 may include instructions and logic that retrieves and maintains data related to the processors 202 or other components, such as performance metrics, component temperatures, power usage, and available power. System monitor 258 may also retrieve and maintain user specifications or system specifications related to power management, as described herein. Thread scheduler 254 may include instructions and logic that assign threads to corresponding strands, and schedules threads to execute on their corresponding strands. Power management component 260 may perform actions, such as sending signals to processor chips 202, that control a clock frequency of processor chips 202, each of cores 102a-h, each FPU 130, other hardware resources or hardware components. Power management component 260 may provide power, turn off power, or control a level of power to a processor chip, a core, or a set of components. Thread scheduler 254 may provide instructions to power management component 260 related to controlling power. Power management component 260 may also control power based on data from processor chips 202 that result from operations of thread scheduler 254. Thread scheduler 254, thread monitor 256, system monitor 258, and power management component 260 may perform at least some of the methods of the present invention. Operations performed by each of these components in accordance with the present invention are discussed in further detail herein.

Though each of the operating system components illustrated in FIG. 2 are shown as separate components, and operations may be described herein as associated with or performed by a component, the invention is not so limited. Instructions or actions of each component may be combined or distributed in a variety of ways, in various configurations, among each other or additional components. In one configuration, each component includes respective modules of software instructions; however each component may be thought of as a logical component that may be implemented in a variety of configurations. In some configurations, at least a part of the logic of any component may be implemented in a hardware component that may reside on processor chips 202 or another part of system 200.

The system memory also includes one or more data storage components 250, which may include data used by the operating system 220 or application programs. Data may be stored in RAM 216 or other storage devices, such as a hard disk drive. One or more applications 252 and application components may be loaded into system memory and executed on operating system 220. Examples of application programs may include search programs, schedulers, calendars, database programs, word processing programs, HTTP programs, customizable user interface programs, IPSec applications, encryption programs, security programs, VPN programs, SMS message servers, IM message servers, email servers, web servers, account management and so forth.

Communication media typically embodies computer-readable instructions, data structures, program modules, or other data in a modulated data signal such as a carrier wave, data signal, or other transport mechanism and includes any information delivery media. The terms "modulated data signal" and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Mechanisms described herein may act to distribute threads in a multi-stranded system in order to manage power consumption and, in particular, to reduce power consumption by the system. Often, the management of power consumption includes considering an actual or potential degradation of performance with respect to one or more threads. There may be a tension between a desire to maximize system performance and a desire to reduce power usage, or maximize power efficiency. Some aspects of the invention include mechanisms that consider one or more factors as part of processes to distribute threads. At least some of these factors are directed to determining a level of performance degradation that may be acceptable when managing power. This may be considered as a tradeoff between optimal performance and optimal power management. Following is a brief discussion of some factors that may be considered as part of a mechanism for power management. These factors are referred to herein as "power management factors." The factors described are not a complete list of power management factors, and other factors may also be included in various embodiments of the invention.

One power management factor is a specification by a system administrator. An administrator may specify an amount of performance degradation that may be acceptable in exchange for maximizing power efficiency of the hardware resources or the system in its entirety. For example an administrator may specify a value in a range that indicates a preference for maximizing performance or maximizing power management. This may be, for example, a value between one and ten, where ten indicates a preference for maximizing performance, one indicates a preference for maximizing power efficiency, and intermediate values indicate the administrator's preference on the scale. An administrator may provide other specifications, such as an allowance of short-term performance degradation, or a variation from a specified average that may be acceptable. The system may also allow an administrator to specify preferences using other mechanisms. The system may include default power management specifications that are used when a system administrator has not provided one or more specifications.

Another power management factor is an amount of power consumption by a processor, one or more cores at issue, hardware resources, other system components of the system, or the system in its entirety. Higher levels of power consumption favor power management and more allowance for performance degradation, while lower power consumption levels may favor less power management. One or more of core temperatures, temperatures of hardware resources, other system components or the system temperature may be power management factors. Higher temperatures in any one or more of these components or in the environment may favor a higher level of power management and a greater allowance for performance degradation, while lower temperatures may favor less power management. Related to temperature is the available capacity of temperature reduction mechanisms, such as fans or water-cooling systems. A system having temperature reduction mechanisms performing close to their capacity may favor power management more than a system in which the temperature reduction mechanisms are performing much lower than their capacity.

Another power management factor that may be considered is the power source and the status of the power source. A system with power supplied by a battery may favor configurations that increase power efficiency by decreasing power usage. In a system with battery power, the total power capacity or the remaining battery strength may be a factor, wherein lower total capacity or lower remaining power strength may favor an even higher preference for mechanisms that increase power efficiency.

The priority of the threads being processed by mechanisms of the invention may be another power management factor. Low priority threads may have more allowance for a degradation of performance, while high priority threads may have a very low allowance for performance degradation. This factor may be considered by embodiments of the invention.

Figure 3:
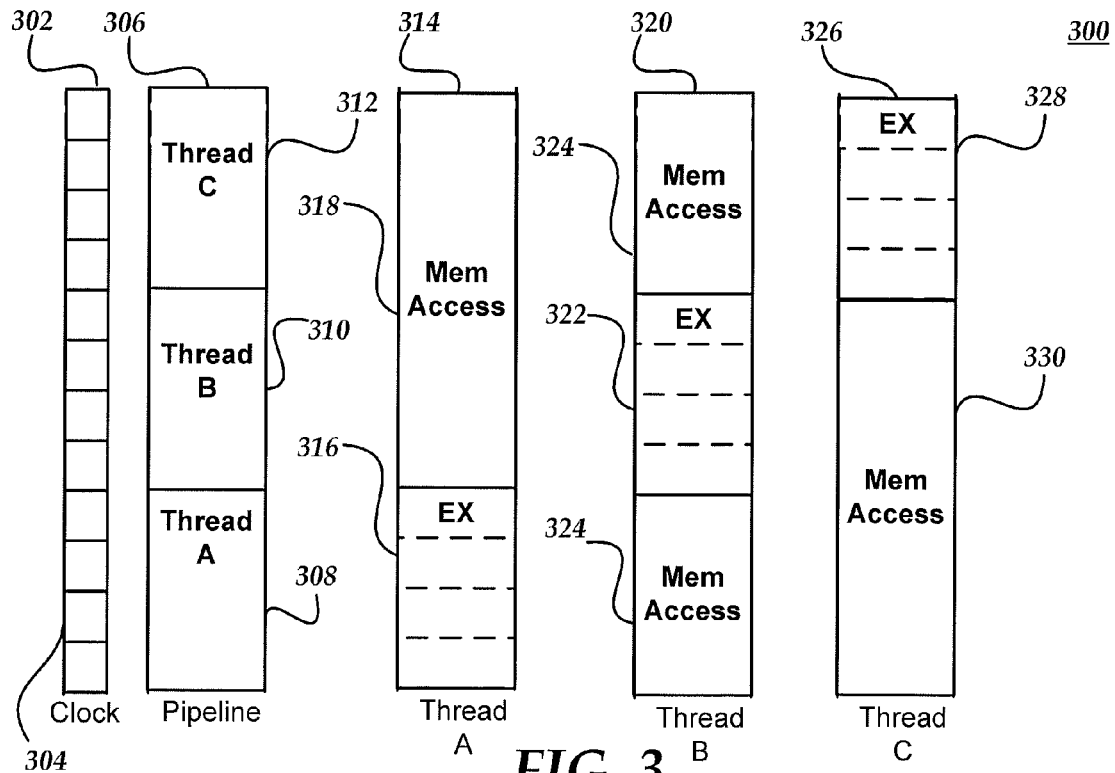
FIGS. 3-6 are timing diagrams generally showing time intervals during various instruction execution operations, with various configurations.

FIG. 3 is a timing diagram generally showing a thread configuration 300 with time intervals during various instruction execution operations. More specifically, FIG. 3 illustrates time during which instructions are executed or during which memory accesses are performed. A clock 302 represents a number of processor clock cycles 304 during a time period P. For illustrative purposes, 12 clock cycles 304 are shown during time period P, though a time period P with virtually any number of clock cycles may be used. The relationship of each clock cycle 304 and time period P to real time depends upon the processor clock frequency. In some embodiments, the clock frequency of a CPU can be controlled by the system, within parameters determined by the processor hardware.

Block 306, representing an instruction execution pipeline, illustrates time intervals corresponding to the instruction execution pipeline. Specifically, instruction execution pipeline 306 includes time interval 308, during which the instruction execution pipeline is executing an instruction of thread A 314. During time interval 310, instruction execution pipeline 306 executes an instruction of thread B 320, and during time interval 312, instruction execution pipeline 306 executes an instruction of thread C 326. Thus, during time period P, instruction execution pipeline 306 is executing each of thread A 314, thread B 320, and thread C 326 for four time intervals. Time intervals 308-312 therefore provide a representation of instruction execution pipeline activity during a sample time period from a longer period of execution. It is understood that this is a simplified representation, and that actual activity during sample time periods may vary. Also, the cycles dedicated to each thread are not necessarily contiguous during period P, though they are illustrated that way to show a simple view. Though the time intervals 308-312 indicate that the instruction execution pipeline is active 100% of the time, this percentage of activity, referred to as pipeline utilization, may vary. Each of pipeline 306, thread A 314, thread B 320, and thread C 326 are a representative segment of a longer time period, and the lengths of each interval illustrate approximate averages during the longer time period. As such, each segment may vary.

Block 314, representing thread A, includes instructions interval 316, representing time intervals during which four different instructions are executed. Memory interval 318 represents a cumulative time interval during which one or more memory accesses are performed. Memory interval 318 may represent a memory access that corresponds to any one or combination of instructions that make up instruction interval 316. In various embodiments, the ratio of instructions to memory accesses, and the duration of memory access in comparison with an instruction execution interval, may vary substantially. For example, a memory access may take 50 or 100 times as long as an instruction execution, or more. In some threads, there may be one or more orders of magnitude as many instructions as there are memory accesses. FIG. 3, as well as subsequent figures, shows a simple configuration for illustrative purposes.

Similarly, block 320, representing thread B, includes instruction interval 322 and memory access interval 324 representing time intervals during which instructions are executed and memory access is performed, respectively. Block 326, representing thread C, includes instruction interval 328 and memory access interval 330 representing time intervals during which instructions are executed and memory access is performed, respectively. In the illustrated configuration, each thread has similar characteristics, though in other configurations, the threads may differ. The intervals of instruction execution and memory access for each thread are illustrated to correspond to the execution intervals of pipeline 306, and may differ in actual configurations. It is to be noted that memory access interval 324 is illustrated as two blocks for illustrative purposes. Actual memory access may be more or less than two time intervals, and are not necessarily contiguous.

As illustrated in FIG. 3, instruction execution pipeline time interval 308 represents a time interval during which instructions 316 are executed by the instruction execution pipeline 306; instruction execution pipeline time interval 310 represents a time interval during which instructions corresponding to instruction interval 322 of thread B are executed by the instruction execution pipeline 306; and instruction execution pipeline time interval 312 represents a time interval during which instructions corresponding to instruction interval 328 of thread C are executed. When any of the threads performs a memory access, the thread is blocked and the processor may switch to one of the other threads. In a situation with optimal timing, whenever a thread blocks, there is always another thread ready to issue an instruction. Thus the illustrated instruction execution pipeline 306 maintains a utilization of 100%.

In the thread configuration 300, thread A executes four instructions during a time period of 12 clock cycles. The CPI of thread A is therefore 12/4, or 3. Similarly, thread B 320 and thread C 326 also execute four instructions per 12 clock cycles, and each has a CPI of 3. Inversely, each of thread A, B, and C has a cycle per instruction (IPC) metric of ⅓, where IPC=1/CPI. Since the total IPC of threads A, B, and C is ⅓+⅓+⅓=1, and instruction execution pipeline 306 is capable of executing one instruction per cycle, all three threads can share instruction execution pipeline 306 without causing degradation of each other's performance. It is understood that this is a simplified and ideal configuration, and that in a typical configuration there may be times when two threads are both ready to issue an instruction and one must wait.

Figure 4:
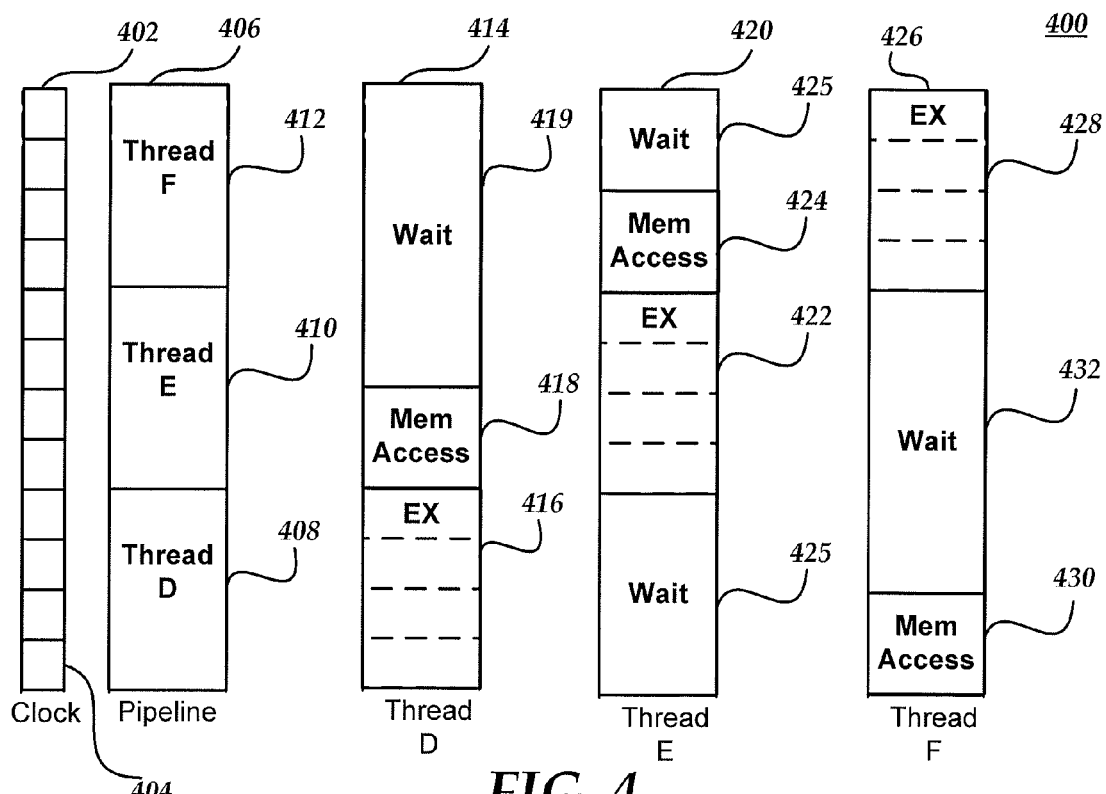

FIG. 4 illustrates another thread configuration 400, with three different threads and an instruction execution pipeline. As described above with respect to FIG. 3, in FIG. 4, clock 402 represents 12 processor clock cycles 404 during a time period P. During time interval 408, instruction execution pipeline 406 executes instructions from thread D 414; during time interval 410, instruction execution pipeline 406 executes instructions from thread E 420; and during time interval 412, instruction execution pipeline 406 executes instructions from thread F 426.

Thread D 414 includes instruction interval 416 and memory access interval 418. Thread E 420 includes instruction interval 422 and memory access interval 424. Thread F includes instruction interval 428 and memory access interval 430.

In thread configuration 400, each of the memory access intervals 418, 424, and 430 corresponding to thread D 414, thread E 420, and thread F 426 is two clock cycles in length. In configuration 400, for each thread, four instructions can be executed during six cycles. The IPC of each of threads D, E, and F is therefore 4/6=⅔. The total IPC of the three threads is ⅔+⅔+⅔=2. The instruction execution pipeline 406 has a capacity of executing one instruction per cycle. As a result, when the three threads execute on instruction execution pipeline 406, there is contention for the pipeline, and at least one thread must block while waiting to execute. This waiting time is represented by wait interval 419 in thread D, wait interval 425 in thread E, and wait interval 432 in thread F. As discussed above, the actual wait intervals may be divided in a number of ways, but the figure illustrates a cumulative waiting time.

When determining CPI or IPC for a thread, the cycles during which the thread is ready is issue an instruction or access memory, but is blocked because of contention is excluded. Thus, the CPI for each of the threads is 6/4=2/3.

Each of instruction execution pipeline 306 of FIG. 3 and instruction execution pipeline 406 of FIG. 4 has a utilization of 100%. However, because the threads D, E, and F of FIG. 4 have a low CPI relative to the CPI of threads A, B, and C of FIG. 3, threads D, E, and F have a contention for the instruction execution pipeline, resulting in wait intervals 419, 425, and 432 for their respective threads.

Figure 5:
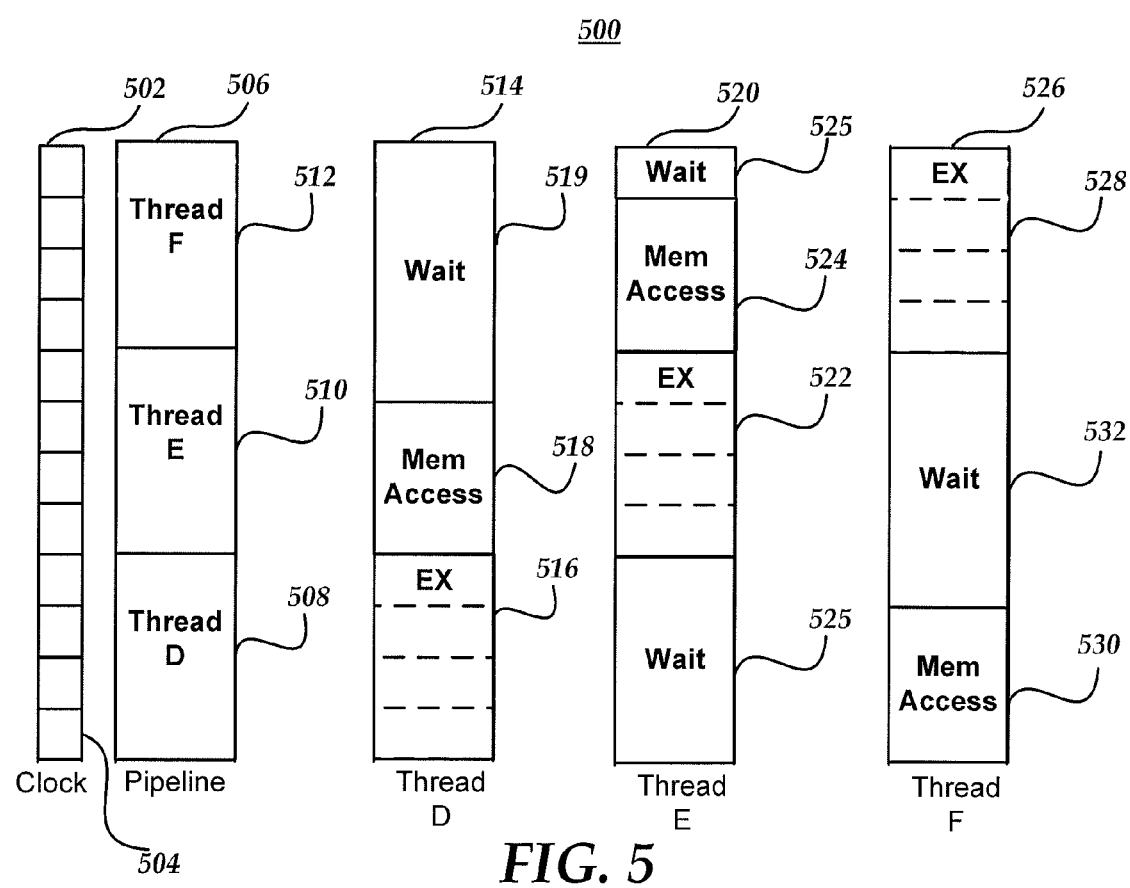

FIG. 5 illustrates an alteration to the thread configuration 400 of FIG. 4, in which the processor frequency has been increased. For illustrative purposes, a 50% increase of the processor frequency is illustrated, though principles discussed apply to greater or smaller frequency increases, such as 10%, 20%, 30% or the like. Clock 502 and clock cycle 504 correspond to clock 402 and clock cycle 402. Thread D 514, instruction interval 516, memory access interval 518, and wait interval 519 correspond to thread D 414, instruction interval 416, memory access interval 418, and wait interval 419. Thread E 520, instruction interval 522, memory access interval 524, and wait interval 525 correspond to thread E 420, instruction interval 422, memory access interval 424, and wait interval 425. Thread F 526, instruction interval 528, memory access interval 530, and wait interval 532 correspond to thread F 426, instruction interval 428, memory access interval 430, and wait interval 432.

Since the cycles 504 of clock 502 are a count of cycles, and not real time, the dimensions of the clock 502 remain the same, though it is to be understood that each clock cycle is 2/3 the real time of clock 404 of FIG. 4. In thread D, instruction interval 516 has a cumulative clock cycle duration of four cycles, as in FIG. 4. However, the memory access time 518 is a function of real time, rather than clock cycle time. Therefore, memory access time 518 in FIG. 5 is three cycles in length, since three cycles at the faster clock speed takes the same real time as two cycles at the previous frequency. Similarly, memory access times 524 and 530 of threads E and F, respectively, are shown as three cycles in length. The CPI of thread D in FIG. 5 is 7/4, and the IPC is 4/7. Similarly the CPI of each thread E and F is 7/4, and each IPC is 4/7. The cumulative IPC of the three threads is 4/7+4/7+4/7=12/7.

Though there is still contention for the instruction execution pipeline in FIG. 5, there is less contention. The wait intervals 519, 525, and 532 of threads D, E, and F, respectively, are reduced to five cycles each, a 17% reduction in cycles and a 44% reduction as measured in real time. Though the CPI of each thread in configuration 500 is increased to 7/4 (as compared with 3/2 in configuration 400), since the real time duration of each clock cycle is reduced by 1/3 in comparison with FIG. 4, the real time duration of each instruction is reduced by approximately 22%. Thus, a 50% increase in clock speed (a 33% reduction of cycle time) results in a corresponding 22% reduction of instruction execution time. Similarly, a lower increase would result in a corresponding inverse reduction of instruction execution time.

Increasing the processor frequency in the thread configuration 300 of FIG. 3 would not have as beneficial an effect on performance as illustrated by FIG. 5. Due to the higher percentage of time spent during memory access, increasing the processor frequency would reduce the real time of instruction execution, but would also result in times when the pipeline is available, but threads are accessing memory and are not ready to issue instructions. When this occurs, the instruction execution pipeline must wait for a memory access to complete before executing an instruction. Though there may be a performance benefit, it would be relatively small in comparison with the increased processor frequency. Since increasing processor frequency often increases power consumption, in some configurations, a system may be configured to selectively increase processor frequency based on the CPI of the threads, the CPI of a portion of threads, the processor utilization, or a combination thereof. The system may be configured to increase or decrease processor frequency by an amount that is based on the CPI of the threads, the CPI of a portion of threads, the processor utilization, or a combination thereof.

Figure 6:
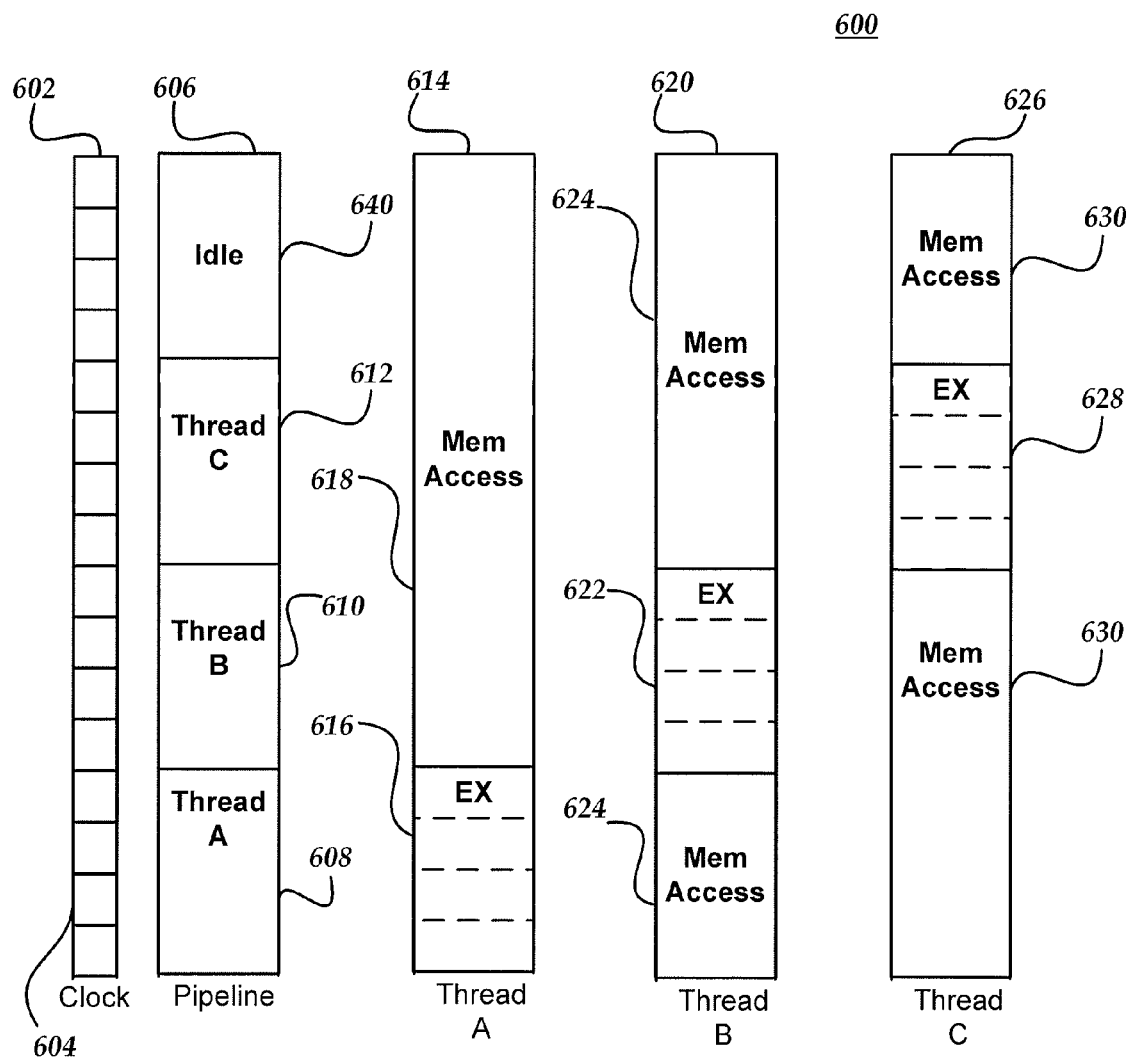

FIG. 6 illustrates an alteration to the thread configuration 300 of FIG. 3, in which the processor frequency has been increased by 50%, so that a clock cycle is reduced by 1/3 real time. Clock 602 represents 16 processor clock cycles 604 during a time period P.

In thread configuration 600, thread A 614 has an instruction execution interval 616 that is four cycles in duration, as for instruction execution interval 316 in configuration 300. However, the memory access interval 618 is 12 cycles in duration, corresponding to memory access interval 318 with 8 cycles, both having the same duration in real time. Similarly, the memory access intervals 624 and 630, corresponding to thread B 620 and thread C 626, respectively, are each 12 cycles in duration. The instruction execution intervals 622 and 628, of thread B 620 and thread C 626, respectively, are each four cycles in duration.

In the instruction execution pipeline 606 of FIG. 6, 16 clock cycles are shown. During time interval 608, instructions of thread A are executed. During time interval 610, instructions of thread B are executed. During time interval 612, instructions of thread C are executed. However, upon completion of time interval 612, instruction execution pipeline 606 becomes idle for four cycles, while memory access 618 of thread A completes. Therefore, an idle interval 640 is introduced. As a result, the utilization of instruction execution pipeline drops to 12/16, or 75%. Thread A now has a CPI of 16/4=4. Thread A 616 takes more clock cycles to execute an instruction than thread A 316, but each cycle takes less real time. The real time for thread A 616 compared with thread A 316 is:

$$(4 CPI \times 66.7\%)/(3 \times 100\%) = 0.889$$

or an approximate gain of 11% by reducing the clock cycle time 33%.

As illustrated by FIGS. 3-6 and the discussion above, increasing the processor frequency of configuration 400 provides much more performance gain than a similar increase in processor frequency of configuration 300. In the examples discussed, the increase for configuration 400 results in approximately twice the performance gain. Since increasing the processor frequency generally requires more power, the amount of performance gain is a consideration when determining whether to increase the processor frequency. The CPI for each thread on a pipeline therefore provides a way to determine whether to increase the processor frequency. The CPI may be one factor to consider when making this determination. It may also be used to consider how much of a change to make in processor frequency.

Similarly, the CPI for each thread may be used to determine whether to reduce a processor frequency. Reducing the processor frequency may result in a reduction in power, a reduction in component temperature, or other benefits. In the illustrated examples, a system may determine to reduce a frequency for a processor having configuration 300, while maintaining or even increasing the processor frequency for a processor having configuration 400. Reducing the frequency in the configuration 300 has less of a performance loss than a similar frequency reduction in the configuration 400. Thus, CPI may be used as a factor to consider when determining whether to decrease a processor frequency or by an amount to decrease the frequency.

CPI metrics may be used when scheduling threads on CPUs. That is, a determination of a CPU to execute a thread may be based on a CPI metric of the thread, as well as CPI metrics of other threads. Scheduling threads based on CPI may provide improvements to the system, such as increased performance, reduction of power usage, reduction of temperatures, or other benefits.

Figure 7:
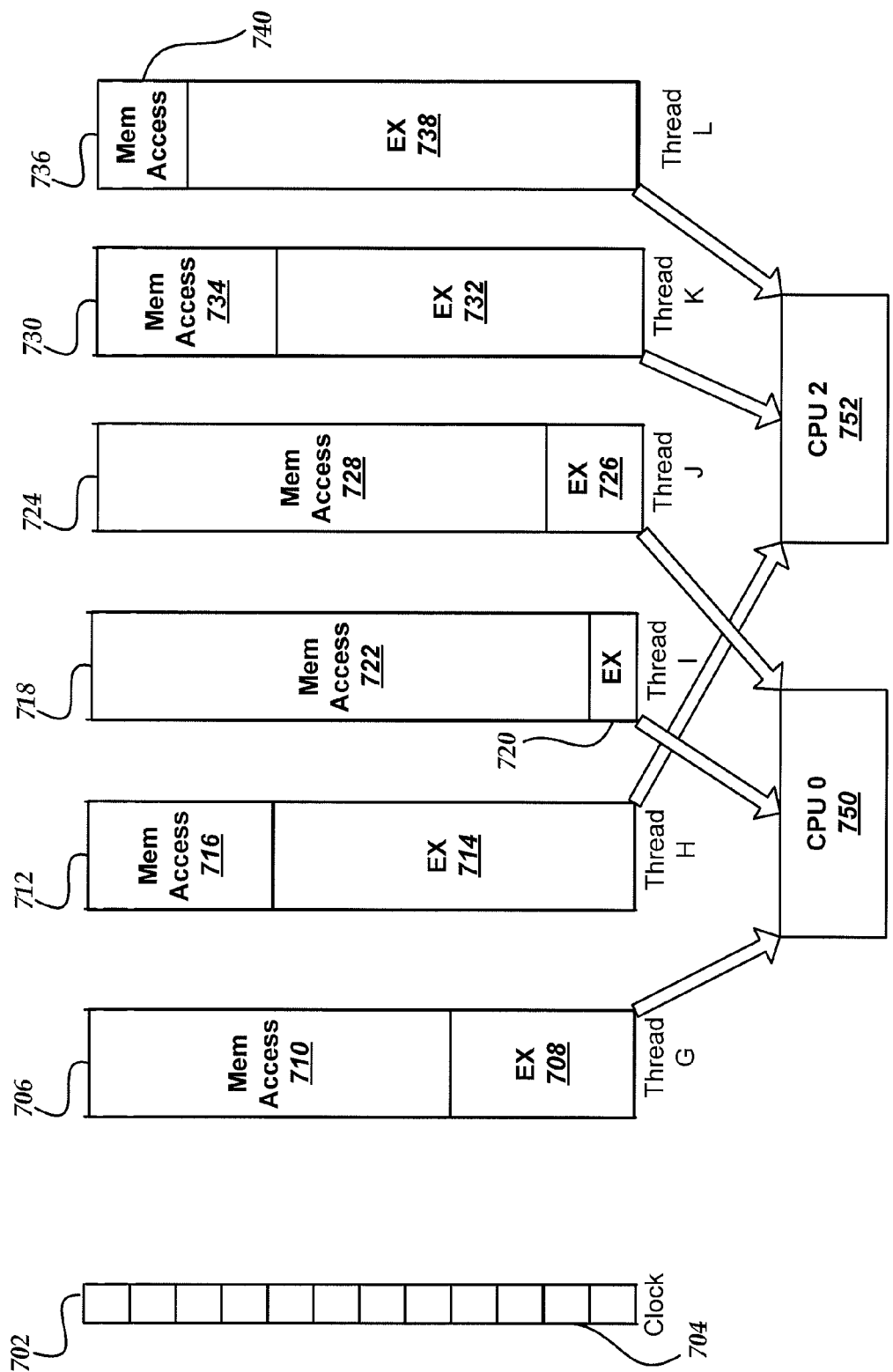
FIG. 7 is a timing diagram generally showing timing intervals of threads in one configuration.

FIG. 7 illustrates six threads that are to be assigned to CPUs. For each thread, an amount of clock cycles during which instruction execution and memory access is performed for a sample time period is shown. This is useful for illustrating the use of CPI for scheduling threads.

In the thread configuration 700 of FIG. 7, clock 702 is shown having 12 clock cycles 704 during a sample time period P. The clock cycles 704 can be used as a scale to illustrate time intervals for each thread. Thread G 706 has an instruction execution interval 708 that is four cycles long, and a memory access interval 710 that is eight cycles long. Thus, during the sample period P, thread 706 has a CPI of 12/4, or 3. Thread H 712 has an instruction execution interval 714 that is 8 cycles long, a memory access interval 716 of 4 cycles, and a CPI of 12/8, or 1.5. Thread I 718 has an execution instruction interval 720 that is 1 cycle long, a memory access interval 722 of 11 cycles, and a CPI of 12/1, or 12.

Thread J 724 has an instruction execution interval 726 that is two cycles long, a memory execution interval 728 of 10 cycles, and a CPI of 12/2, or 6. Thread K 730 has an instruction execution interval 732 that is 8 cycles long, a memory access interval 734 of 4 cycles long, and a CPI of 12/8, or 1.5. Thread L 736 has an instruction execution interval 738 that is 10 cycles long, a memory access interval 740 of 2 cycles, and a CPI of 12/10, or 1.2.

During a process of scheduling each of the threads G-L of FIG. 7, the CPI of each thread may be determined. In one implementation, this may be performed by counting instructions executed during one or more sample periods and calculating an average number of cycles that it takes to execute an instruction. The sample period used for each thread may be the same sample period, or they may differ. The process may then group threads so that threads having relatively high CPI values are assigned to a CPU or a set of CPUs sharing an instruction execution pipeline. This may result in a configuration such that, for each thread, a high amount of time is spent accessing memory, rather than executing instructions. In one embodiment, the system may configure the CPU, or its corresponding core, to perform at a lower clock frequency, and lower the amount of power provided to the core. As discussed above, this may reduce power consumption or temperature, while having a performance impact that is within acceptable limits. As illustrated in the example configuration of FIG. 7, thread G 706, thread J 724, and thread I 718 have the highest CPI values. In one implementation, each of these threads may be assigned to a single CPU, or to a set of CPUs that share an instruction execution pipeline, for example, CPU 750.

In one embodiment, a process of scheduling threads may group threads so that threads having relatively low CPI values are assigned to a CPU or a set of CPUs sharing an instruction execution pipeline. This may result in a configuration such that, for each thread, a relatively low amount of time is spent accessing memory. In one embodiment, the system may configure the CPU, or its corresponding core, to perform at a higher clock frequency, increasing the amount of power provided to the core as necessary. Though this may increase power consumption or component temperature, it may have a performance improvement that is desirable even when the power or temperature increase is considered. As illustrated in the example configuration of FIG. 7, thread H 712, thread K 730, and thread L 736 have the lowest CPI values. In one implementation, each of these threads may be assigned to a single CPU, or to a set of CPUs that share an instruction execution pipeline, for example, CPU 752. In one implementation, when scheduling threads to a CPU, the CPI or its inverse IPC, of each thread is considered in order to avoid an excessive amount of CPU demand, as discussed herein.

As shown by the illustration of FIG. 7, coalescing threads that have a high CPI onto a set of one or more CPUs may provide benefits of determining an optimal configuration with respect to power usage and performance. Also, coalescing threads that have a low CPI onto a set of one or more CPUs may provide similar benefits to minimizing power usage while maximizing performance. Thus, coalescing high CPI threads, reducing power or processor frequency to CPUs executing high CPI threads, coalescing low CPI threads, increasing power or processor frequency to CPUs executing low CPI threads, or other actions described herein may be used, alone or in combination, to improve a system concerned with power usage, component temperatures, or performance.

In one embodiment, a system may determine whether a processing unit, such as a CPU or instruction execution pipeline, has a utilization that is above a desired amount, and assign one or more threads to reduce the utilization. For example, a system may determine a number of cycles in which one or more threads are waiting to issue an instruction because the pipeline is busy executing an instruction of another thread. A cumulative, average, peak, or other metric based on this utilization may be used to determine an assignment for one or more threads. In one embodiment, a hardware component in the system may trigger a trap in response to determining that pipeline utilization is above a predetermined threshold. The system may consider such a trap when scheduling threads.

In the configuration of FIG. 7, the low CPI threads have a CPI of 1.5 or less, while the high CPI threads have a CPI of 3 or more. In various implementations or configurations, the categorization of threads by CPI may vary. In some configurations, a CPI of 3 may be considered to be low, for example. The categorization may be based on comparison with other threads, so that whether a CPI value is considered low, high, or intermediate may depend on the CPI values of other threads.

Figure 8:
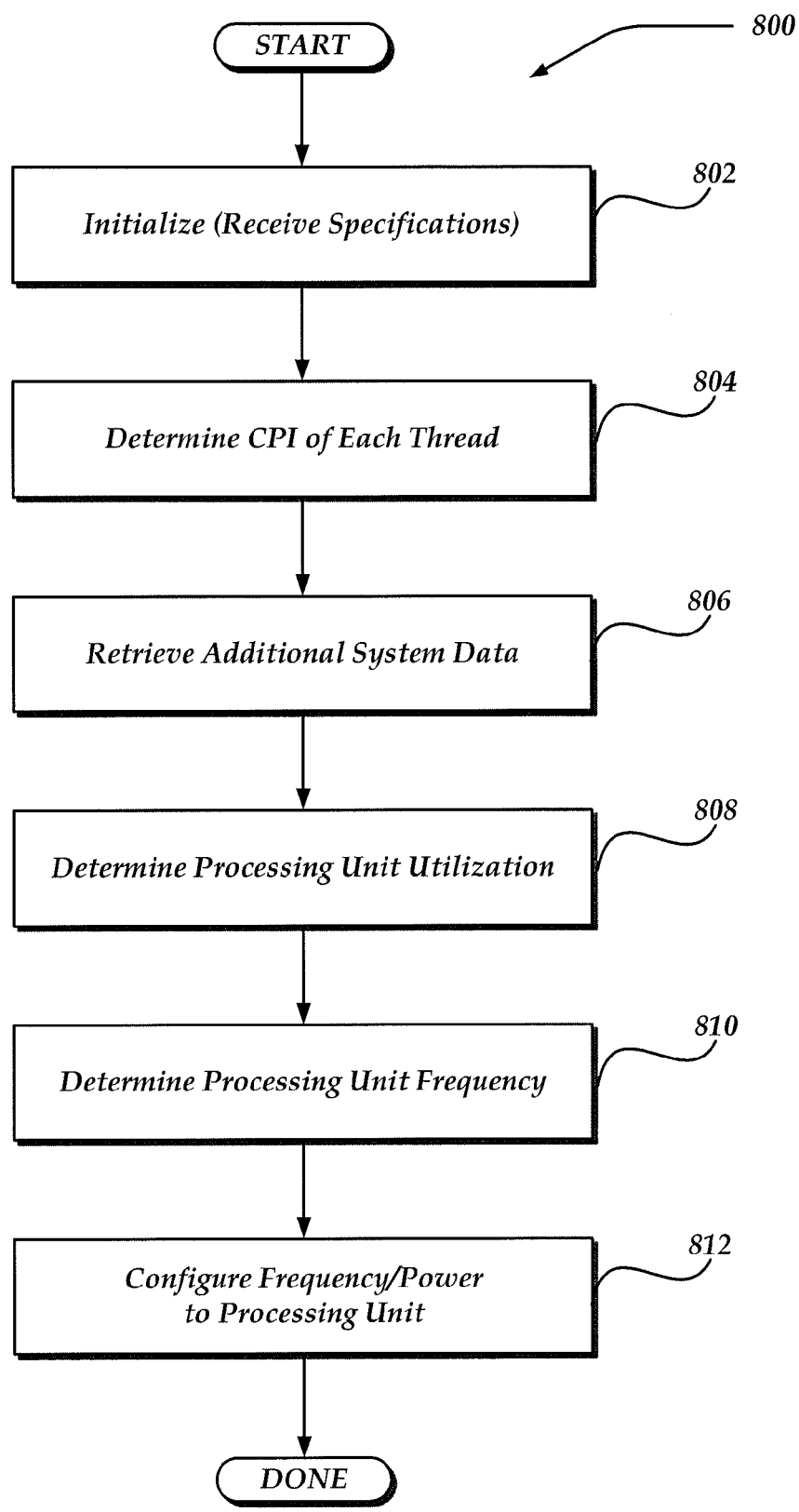
FIG. 8 is a flow diagram generally showing a process for managing power consumption in a multi-stranded computer system.

FIG. 8 is a logical flow diagram generally showing one embodiment of a process 800 for managing power usage by one or more cores. Process 800 may employ the processor system 100 of FIG. 1, system 200 or the operating system 220 of FIG. 2, or portions thereof.

Process 800 begins, after a start block, at block 802, where initialization is performed. Initialization may include receiving or retrieving systems specifications or administrator specifications employed during the process 800, as discussed herein. These specifications may include preferences related to power management or performance requirements, or the like. System specifications may include system configuration information, hardware resource capacities or other characteristics, processor capacities or other characteristics, or the like. The initialization of block 802 may include determining values such as a maximal processing unit usage, power thresholds, or other thresholds from the various specifications and data.

The process 800 may flow to block 804, where CPI characteristics are determined or retrieved for each thread. This action may include determining characteristics during one or more sampling intervals, or retrieving characteristics previously or concurrently determined. In some embodiments, hardware may provide assistance to software in determining characteristics of a thread. In one embodiment, a hardware performance counter may be used to determine CPI characteristics of a thread. During a specified period of time, a hardware performance counter may be incremented for each executing instruction. A hardware performance counter may also count the total number of clock cycles during the same time period. A software component, such as thread monitor 256 of FIG. 1, may use the performance counters by resetting the counters to zero at the beginning of a sampling period and retrieving each counter value at the end of the sampling period. A computation may calculate the CPI during the time period. A sampling process may obtain data for one or more sampling periods, or may vary the length of a sampling period. In various embodiments, the length of sampling periods may be based on the volatility of the CPI characteristics being determined.

One aspect of the invention that may be employed in various embodiments is the use of thread behaviors to predict future behaviors. For example, a determination of CPI during a sampling period is used to determine that in future periods, the CPI will be consistent with the sampling periods.

The process 800 may flow to block 806, where additional system or environment data is retrieved or determined. This data may include data related to any one or more of the power management factors discussed herein, or other factors. This may include temperatures of cores, the system, or other components. The data may include power consumption by cores, cooling mechanisms, the system, or other components. The data may include power supply data, such as remaining battery strength. The data may include thread-specific data, such as a priority of each thread, longevity of each thread, or other dynamic or static thread data.

The process 800 may flow to block 808, where a utilization of one or more processing units is retrieved or determined. As discussed herein, the utilization may be a metric of a percentage of cycles during which an instruction is being executed, an inverse idle time, a metric of threads that are waiting to issue a thread, or a length of time that each thread has been waiting to issue an instruction, or another metric.

The process may flow to block 810, where the process determines a desired processor frequency or power usage of the processing unit. This may include determining whether to modify a current configuration, in which direction to modify the current configuration, or an amount to modify the current configuration. For ease of discussion, it is considered that the determination is of a desired frequency value. However, it is to be understood that a determination may be made of whether to increase, decrease, or maintain a frequency to achieve a similar result.

The determination at block 810 may be based on the CPI of each thread that is assigned to the processing unit. This may include an average CPI, an aggregate CPI, high or low values of CPI, or another value derived from the CPIs of one or more threads. As used herein, the term aggregate CPI includes metrics derived from considering one or more thread CPI metrics. The determination may be based on additional factors, such as user preferences or other configured settings, dynamic system characteristics, or environmental factors, as discussed herein, or the like. Thread priorities may also be considered as a factor. As discussed herein, the process may increase a frequency or maintain a high frequency when the threads executing on the processing unit have a low CPI, so that the thread performance closely corresponds to the processing unit frequency. The process may lower the frequency or maintain a low frequency when the threads executing on the processing unit have a high CPI, and the thread performance is less closely related to the processing unit frequency. As discussed herein, user specifications, performance metrics, component temperatures, power usage, available power, or other factors may be used in determining the processor frequency.

Though the illustrated configurations of FIGS. 3-7 show processing units in which the threads have similar CPI characteristics, in some configurations threads executing on a processing unit may differ. For example, a processing unit may have two threads with a low CPI and one thread with a high CPI. As discussed above, the process may consider average metrics, cumulative metrics, or other considerations when determining a processing unit frequency.

The process may flow to block 812, where the processing unit is configured to the determined frequency. Depending on the current configuration, this may result in increasing or decreasing the current frequency, or maintaining a current frequency. In one embodiment, a minimal threshold of difference or a minimal difference for a specified number of cycles may be required to change a current frequency. The action of block 812 may include configuring an amount of power that is provided to the processing unit, associated hardware resources, or other associated components.

The process 800 may flow to a done block and return to a calling program, or it may loop back to block 802 or 804 to repeat the actions described herein, or a portion thereof.

Figure 9:
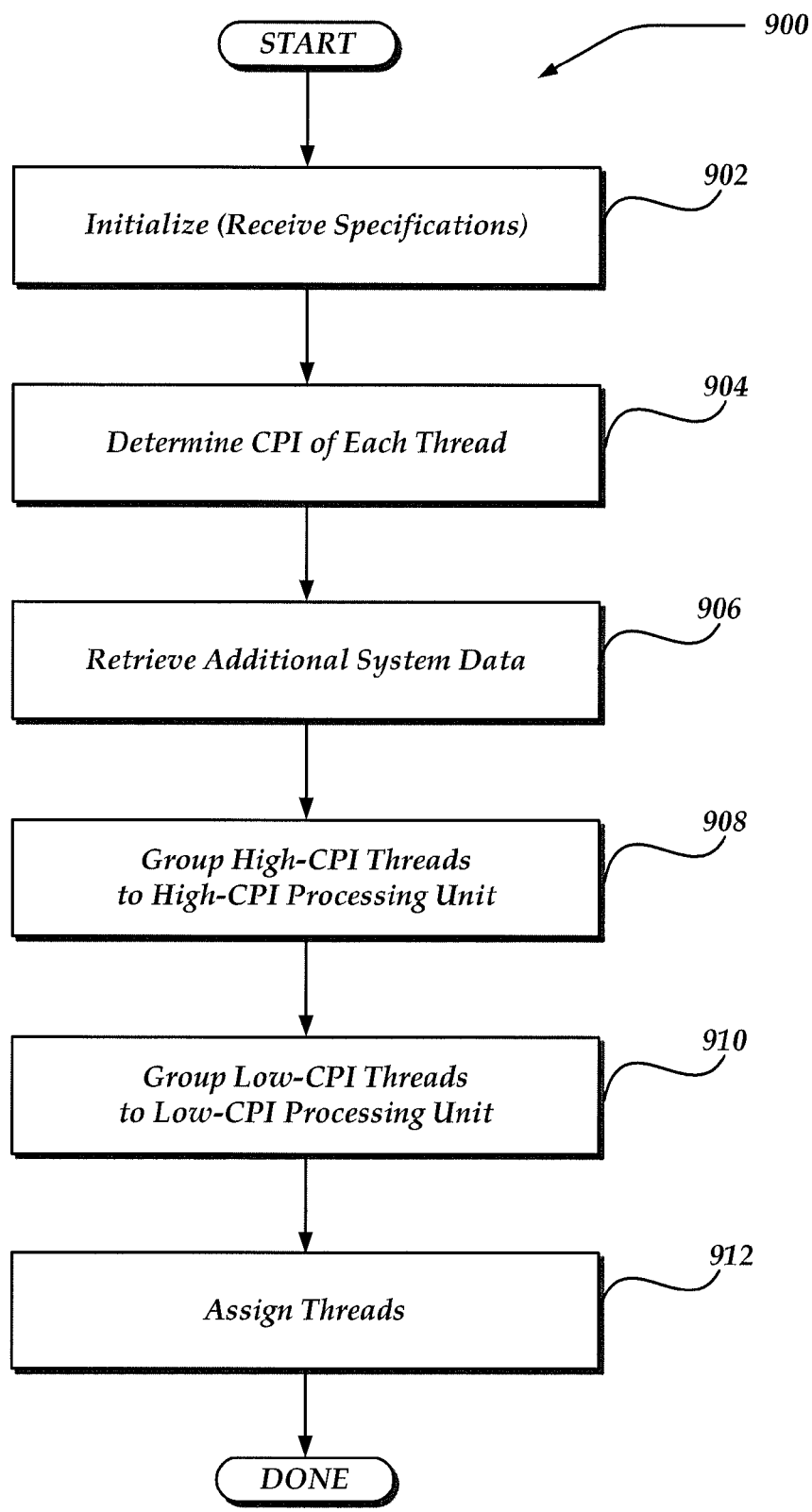
FIG. 9 is a flow diagram generally showing a process for scheduling threads in a multi-stranded computer system.

FIG. 9 is a logical flow diagram generally showing one embodiment of a process 900 for distributing threads among a plurality of cores. In one embodiment, thread scheduler 254 of FIG. 2 may perform all or at least a portion of the actions of process 900. Thread monitor 256 and system monitor 258 may perform at least a portion of the actions of process 900. Various other implementations may also be used in accordance with the present invention.

Process 900 begins, after a start block, at block 902, where initialization is performed. Process 900 may flow to block 904, where CPI characteristics are determined or retrieved for each thread, and block 906, where additional system or environment data is retrieved or determined. Actions of blocks 902, 904, and 906 may be similar to blocks 802, 804, and 806, respectively, of FIG. 8, and the descriptions of the corresponding blocks may apply to each of them. These actions are included in FIG. 9 to illustrate that in various configurations, theses data determination and retrieval actions may be performed as part of a thread scheduling process 900, a power management process 800, or a combination thereof. The processes may be combined or integrated in a number of ways, or either one may be performed separately.

Process 900 may flow to blocks 908 and 910, where threads may be grouped together and associated with processing units based on the CPI of each thread. More specifically, block 908 includes an action of associating threads having a high CPI metric with one or more processing units designated as "high-CPI" processing units. FIG. 3 illustrates a configuration in which three high CPI threads have been associated with a high-CPI processing unit. Block 910 includes an action of grouping threads having a low CPI metric and associating them with one or more processing units designated as "low-CPI" processing units. FIG. 4 illustrates a configuration in which three low CPI threads have been associated with a low-CPI processing unit. In FIG. 7, thread G 706, thread I 718, and thread J 724 have a high CPI and have been assigned to high-CPI CPU 750; thread H 712, thread K 730, and thread L 736 have a low CPI and have been assigned to low-CPI CPU 752. The processing units of FIGS. 3 and 4 are instruction execution pipelines. The processing units of FIG. 7 are CPUs. In various implementations, the processing unit may be a CPU, a core, a processor chip, or another unit of a processor in which frequency or power may be adjusted. As discussed herein, assigning threads to a processing unit may consider one or more of a number of factors, including processor load, contention, or the like. In one embodiment, the assignment of threads may consider a desired processing unit utilization threshold, in order to maintain utilization below the threshold.

The determination of the processing units to assign each thread may be based on one or more of a number of specifications or factors. As discussed herein, a specification of a preference for power management or performance, including long-term, short-term, or average specifications, a tolerance of performance degradation, priority of threads, core temperatures or power usage, power source, or any of the power management factors discussed herein, or combination thereof, may affect the determination in blocks 908 and 910.

The process 900 may flow to block 912, where each of the threads is assigned and scheduled to execute on their respectively assigned processing units. It is to be noted that this scheduling may result in a queue for one or more cores, where there are more threads assigned to a core than there are hardware threads supported by the core. Conventional mechanisms for handling such conditions may be employed for this.

The process 900 may flow to a done block, where the method returns to a calling program.

In one embodiment, thread scheduler 254, thread monitor 256, system monitor 258, or power manager 260 may perform all or a portion of the actions of process 800 or process 900. In some embodiments, actions may be configured in other ways among these components or may be performed by other components. In one embodiment, at least some of these components may perform actions in parallel with each other, communicating when desired to exchange data. For example, thread monitor 256 may continuously determine the CPI of threads, while system monitor 258 continuously monitors system conditions. Thread scheduler 254 may retrieve data from thread monitor 256 and system monitor 258, and assign threads to processing units. Power manager 260 may retrieve data from thread monitor 256 and system monitor 258, and perform actions of process 800, or portions thereof. Various other system architectures may also be employed. In one embodiment, process 800 may be selectively invoked based on system data. For example, it may be invoked when power usage or component temperatures reach a threshold, or when increased performance is desired. In some embodiments, hardware components in system 100, or other hardware components not illustrated, may assist the performance of at least some of the actions of process 800.

It will be understood that each block of the flowchart illustrations of FIGS. 8-9, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented method such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A system for managing power comprising:
   a processor comprising a plurality of processing units, wherein the plurality of processing units comprises a processing unit executing a first thread and a second thread;
   a thread monitor configured to:
      determine a first cycles per instruction (CPI) characteristic of the first thread; and
      determine a second CPI characteristic of the second thread;
   a component configured to calculate an aggregate CPI metric for the processing unit based on the first CPI characteristic and the second CPI characteristic; and
   a power manager configured to:
      modify a clock frequency of the processing unit based on the aggregate CPI metric for the processing unit.

2. The system of claim 1, wherein modifying the clock frequency of the processing unit comprises:
   calculating a desired processor frequency based on the first CPI characteristic and the second CPI characteristic.

3. The system of claim 2, wherein modifying the clock frequency of the processing unit further comprises:
   configuring an amount of power provided to the processing unit based on the desired processor frequency.

4. The system of claim 1, further comprising a wherein the thread monitor determines the first CPI characteristic during at least one sample period.

5. The system of claim 1, wherein the further comprising:
   a thread scheduler configured to schedule a third thread on the processing unit based on a determination that a third CPI characteristic of the third thread is similar to the first CPI characteristic.

6. The system of claim 1, wherein the power manager is further configured to:
   lower the clock frequency of the processing unit based on a determination that the aggregate CPI metric for the processing unit has increased.

7. The system of claim 1, further comprising a hardware counter that assists the thread monitor to determine the CPI characteristic of the first thread.

8. A method of managing power in a processing system having plurality of processing units, comprising:

determining a first cycles per instruction (CPI) characteristic for a first thread of a plurality of threads assigned to a processing unit of a plurality of processing units;

determining a second CPI characteristic of a second thread assigned to the processing unit;

calculating an aggregate CPI metric for the processing unit based on the first CPI characteristic and the second CPI characteristic; and modifying a clock frequency of the processing unit based on the aggregate CPI metric.

9. The method of claim 8, further comprising:

configuring a high clock frequency of the processing unit if the aggregate CPI metric is low; and configuring a low clock frequency of the processing unit if the aggregate CPI metric is high.

10. The method of claim 8, further comprising selectively assigning a third thread of the plurality of threads to the processing unit based on a third CPI characteristic of the third thread.

11. The method of claim 8, further comprising:

configuring a higher amount of power to the processing unit based on a determination that the first CPI characteristic and the second CPI characteristic have a lower aggregate CPI; and configuring a lower amount of power to the processing unit based on a determination that the first CPI characteristic and the second CPI characteristic have a higher aggregate CPI.

12. The method of claim 8, further comprising:

increasing a frequency of the processing unit based on a determination that the first CPI characteristic and the second CPI characteristic have an aggregate CPI that has decreased; and decreasing a frequency of the processing unit based on a determination that the first CPI characteristic and the second CPI characteristic have an aggregate CPI that has increased.

13. A non-transitory computer readable medium comprising instructions that, when executed by a processor, perform a method, the method comprising:

determining a first cycles per instruction (CPI) characteristic for a first thread of a plurality of threads executing on a processing unit, wherein the processing unit is one of a plurality of processing units on the processor;

determining a second CPI characteristic for a second thread of the plurality of threads executing on the processing unit;

calculating an aggregate CPI metric for the processing unit based on the first CPI characteristic and the second CPI characteristic; and modifying a frequency of the processing unit based on the aggregate CPI metric of the processing unit.

14. The non-transitory computer readable medium of claim 13, wherein the method further comprises:

assigning a third thread to the processing unit based on a third CPI characteristic of the third thread.

15. The non-transitory computer readable medium of claim 14, wherein assigning the third thread comprises:

determining that the third CPI characteristic of the third thread is similar to the first CPI characteristic metrics and the second CPI characteristic.

16. The non-transitory computer readable medium of claim 13, wherein determining the first CPI characteristic metric for the first thread comprises:

determining a number of instructions, issued by the first thread, that are executed during a sample period.

17. The non-transitory computer readable medium of claim 13, wherein the method further comprises:

increasing power provided to the processing unit when the aggregate CPI metric of threads assigned to the processing unit decreases.

18. The non-transitory computer readable medium of claim 13, wherein the method further comprises:

decreasing power provided to the processing unit when the aggregate CPI metric of threads assigned to the processing unit increases.

19. The non-transitory computer readable medium of claim 16, wherein the determination of the number of instructions, issued by the first thread, that are executed during the sample period is performed by a hardware component.

20. The non-transitory computer readable medium of claim 13, wherein the method further comprises:

determining an aggregate instructions per cycle (IPC) metric for the first thread and the second thread.

* * * * *